US008951653B2

(12) United States Patent
Kurita (10) Patent No.: US 8,951,653 B2
(45) Date of Patent: Feb. 10, 2015

(54) BATTERY MODULE WITH THERMISTOR SUPPORTER

(75) Inventor: Tomomi Kurita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 377 days.

(21) Appl. No.: 13/445,917

(22) Filed: Apr. 13, 2012

(65) Prior Publication Data

US 2012/0315508 A1    Dec. 13, 2012

(30) Foreign Application Priority Data

Jun. 8, 2011    (JP) .................................. 2011-128048

(51) Int. Cl.
| | |
|---|---|
| *H01M 10/50* | (2006.01) |
| *H01M 2/36* | (2006.01) |
| *H01M 10/48* | (2006.01) |
| *H01M 2/10* | (2006.01) |
| *H01M 10/613* | (2014.01) |
| *H01M 10/625* | (2014.01) |
| *H01M 10/647* | (2014.01) |
| *H01M 10/6557* | (2014.01) |

(52) U.S. Cl.
CPC .......... *H01M 2/1077* (2013.01); *H01M 10/482* (2013.01); *H01M 10/486* (2013.01); *H01M 10/5004* (2013.01); *H01M 10/5016* (2013.01); *H01M 10/5032* (2013.01); *H01M 10/5059* (2013.01); *H01M 2220/20* (2013.01)
USPC .......... 429/7; 248/222.12; 248/316.7

(58) Field of Classification Search
CPC . H01M 2/1077; H01M 10/48; H01M 10/482; H01M 10/486; H01M 10/5004; H01M 10/5032; H01M 10/5059; H01M 10/5016
USPC ................. 429/7; 248/222.12, 316.7
See application file for complete search history.

(56) References Cited

U.S. PATENT DOCUMENTS

| | | | |
|---|---|---|---|
| 6,610,439 B1 * | 8/2003 | Kimoto et al. ................... 429/90 |
| 7,766,544 B2 * | 8/2010 | Shibuya et al. ................ 374/152 |
| 2004/0004461 A1 * | 1/2004 | Hamada et al. ................ 320/112 |
| 2009/0041082 A1 * | 2/2009 | Paramasivam et al. ....... 374/152 |
| 2009/0111015 A1 * | 4/2009 | Wood et al. .................... 429/164 |
| 2009/0117452 A1 * | 5/2009 | Wiesner et al. ................. 429/90 |
| 2009/0130545 A1 * | 5/2009 | Wood et al. ..................... 429/90 |
| 2011/0177379 A1 * | 7/2011 | Maguire ....................... 429/154 |

FOREIGN PATENT DOCUMENTS

| | | |
|---|---|---|
| JP | 2003-346923 | 12/2003 |
| JP | 2010-287550 | 12/2010 |

OTHER PUBLICATIONS

Japanese Office Action for corresponding JP Application No. 2011-128048, Sep. 27, 2013.

* cited by examiner

*Primary Examiner* — Milton I Cano
*Assistant Examiner* — Michael Dignan
(74) *Attorney, Agent, or Firm* — Mori & Ward, LLP (57) ABSTRACT

A battery module includes a plurality of battery cells, a plurality of holders, and a thermistor. Each of at least one of holders includes a thermistor holder. The thermistor supporter includes a pair of thermistor receiving segments, a pair of thermistor engagement segments, and a thermistor cover portion. The sensor casing includes a bias portion and an elastic claw portion. The bias portion is provided to press the sensor against one of the top surface and the bottom surface provided in the at least one of the battery cells by utilizing a reaction force generated by pressing the thermistor cover portion. The elastic claw portion has a width larger than the distance between the pair of thermistor receiving segments when the elastic claw portion is in a free state.

5 Claims, 11 Drawing Sheets

BATTERY MODULE WITH THERMISTOR SUPPORTER

CROSS-REFERENCE TO RELATED APPLICATIONS

The present application claims priority under 35 U.S.C. §119 to Japanese Patent Application No. 2011-128048, filed Jun. 8, 2011, entitled "Battery Module". The contents of this application are incorporated herein by reference in their entirety.

BACKGROUND OF THE INVENTION

1. Field of the Invention

The present invention relates to a battery module.

2. Discussion of the Background

A known type of battery module is discussed in Japanese Unexamined Patent Application Publication No. 2010-287550, in which multiple battery cells are stacked with separators (holders) interposed therebetween and are cooled by a cooling medium flowing along the separators. In this battery module, sensor holders having temperature sensors (thermistors) are secured to openings formed in the top surfaces of the separators by using bolts, and the temperature of the battery cells is detected by bringing the temperature sensors into contact with the battery cells.

SUMMARY OF THE INVENTION

According to one aspect of the present invention, a battery module includes a plurality of battery cells, a plurality of holders, and a thermistor. The plurality of battery cells each have a top surface, a bottom surface, a pair of main cooling surfaces, and a pair of side surfaces. The battery cells are arranged in a stacked manner such that the main cooling surfaces face each other. The plurality of holders has a substantially same shape, and is respectively provided between the main cooling surfaces facing each other. Each of at least one of holders includes a thermistor holder. The thermistor is inserted in and supported by the thermistor supporter to be in contact with at least one of the battery cells. The thermistor includes a sensor and a sensor casing supporting the sensor. The sensor is configured to detect a temperature of the at least one of the battery cells. Cooling medium passages through which a cooling medium is to flow are respectively provided between the battery cells. The cooling medium passages each extend from one of the pair of side surfaces to another of the pair of side surfaces. The thermistor supporter is provided to face one of the top surface and the bottom surface provided in the at least one of the battery cells, and includes a pair of thermistor receiving segments, a pair of thermistor engagement segments, and a thermistor cover portion. The pair of thermistor engagement segments are respectively provided forward, in an inserting direction of the thermistor, relative to the pair of thermistor receiving segments. A distance between the pair of thermistor engagement segments is larger than the pair of thermistor receiving segments. The thermistor cover portion is disposed so that a gap is provided between the thermistor cover portion and one of the top surface and the bottom surface provided in the at least one of the battery cells. The sensor casing includes a bias portion and an elastic claw portion. The bias portion is provided to press the sensor against one of the top surface and the bottom surface provided in the at least one of the battery cells by utilizing a reaction force generated by pressing the thermistor cover portion. The elastic claw portion has a width larger than the distance between the pair of thermistor receiving segments when the elastic claw portion is in a free state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

An embodiment of the present application will be described below with reference to FIGS. 1 to 11.

Figure 1:
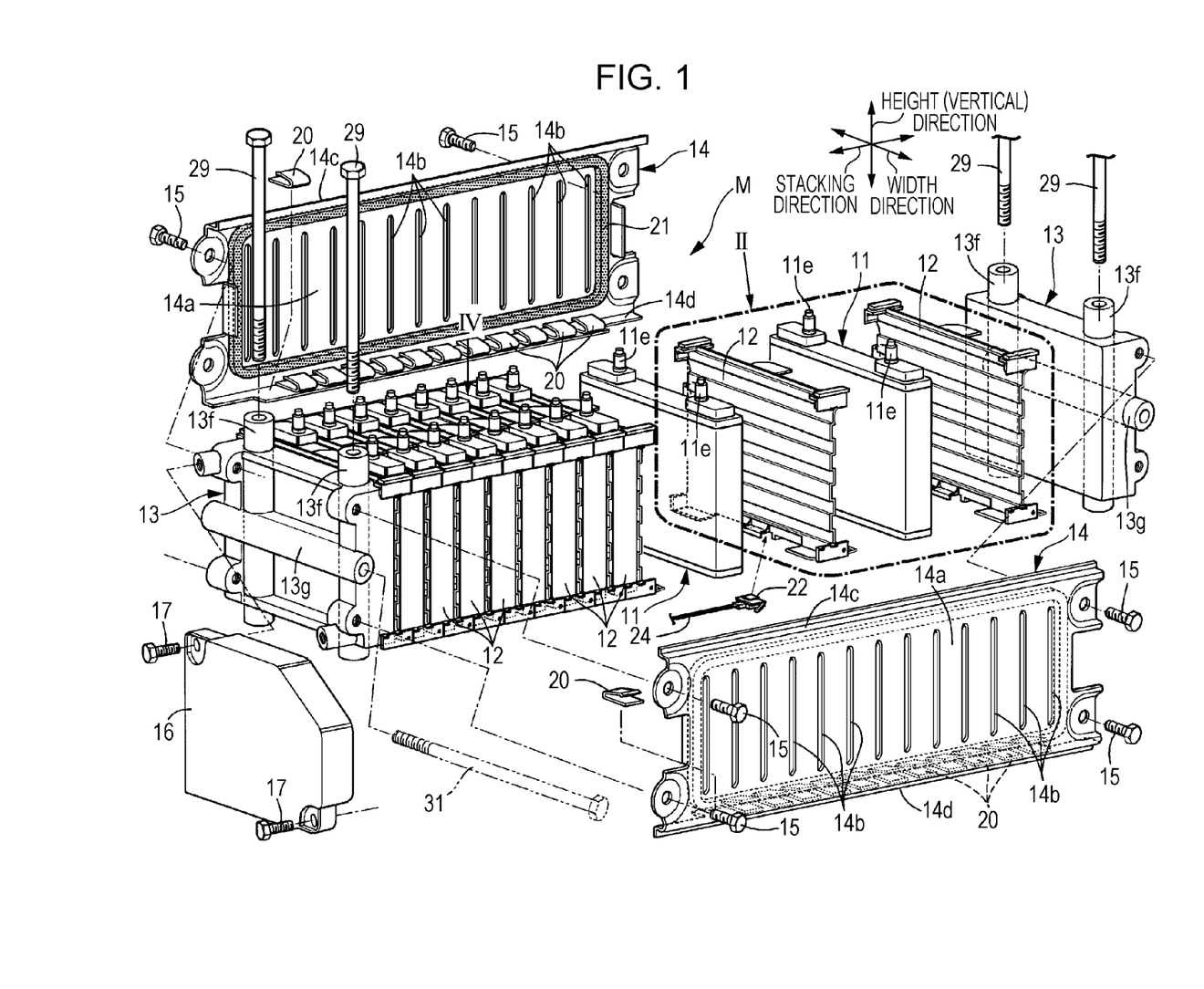
FIG. 1 is an exploded perspective view of a battery module.
Figure 2:
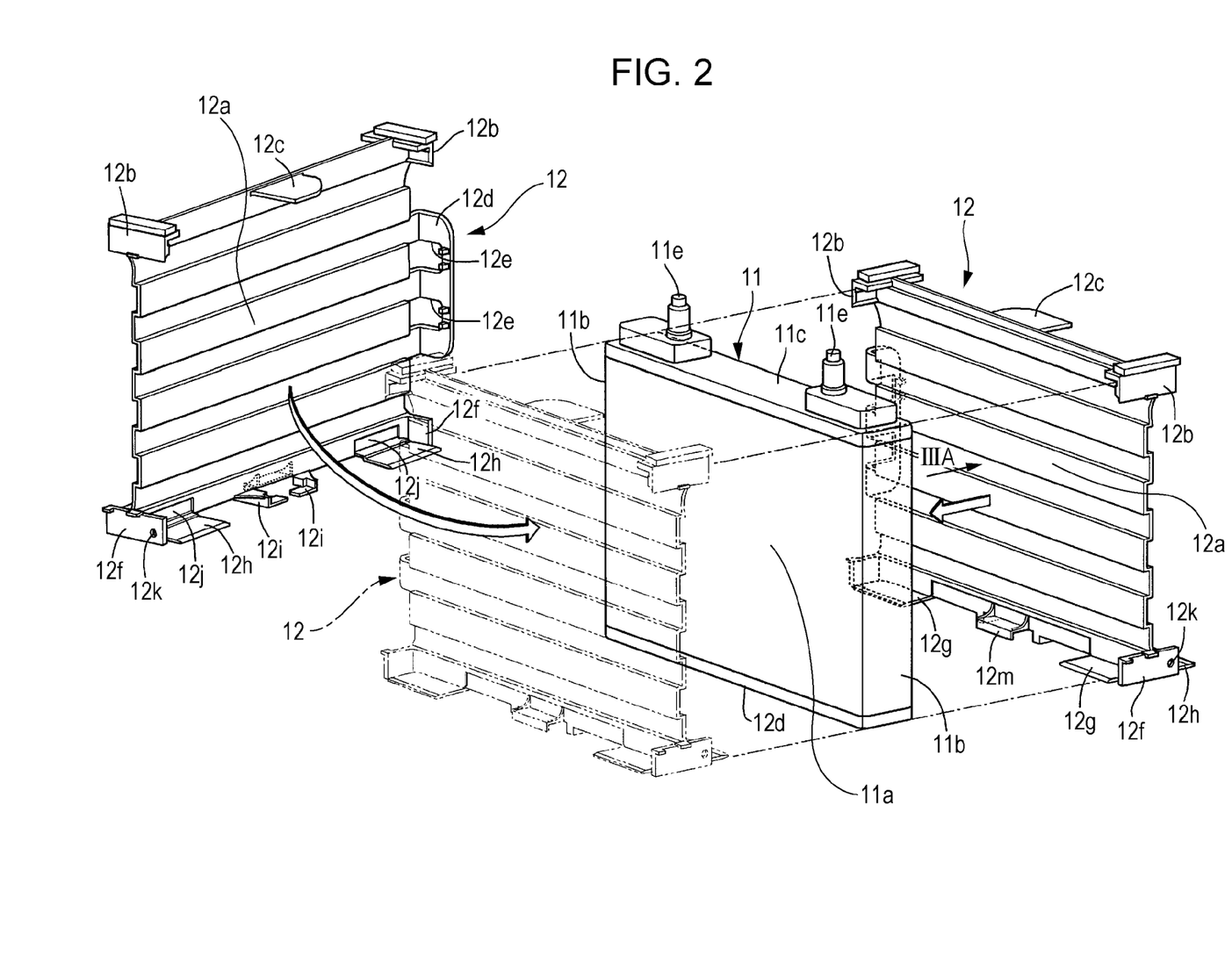
FIG. 2 is an enlarged view of part II in FIG. 1.
Figure 3A:
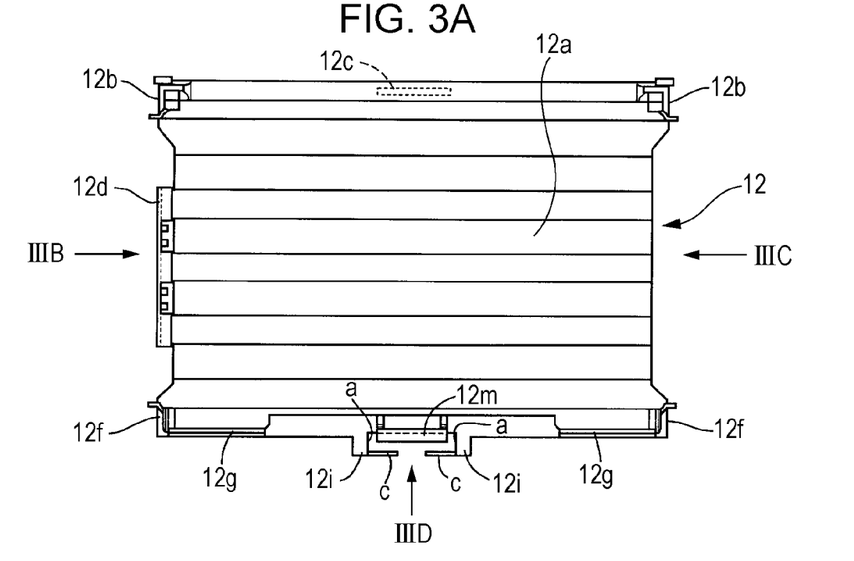
FIGS. 3A to 3D are four orthogonal views, respectively, of a holder.
Figure 3B:
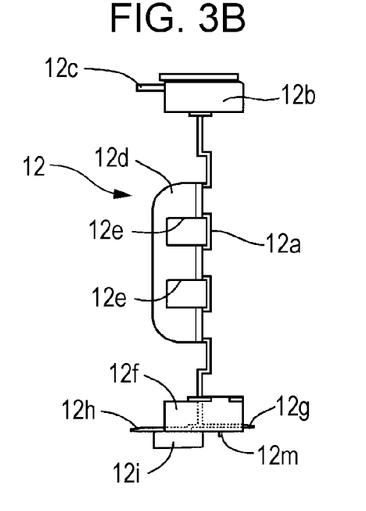
Figure 3C:
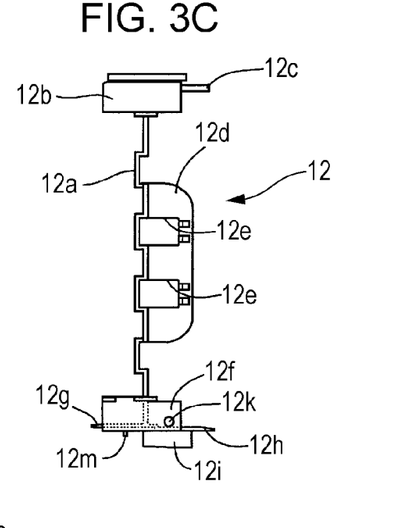
Figure 3D:
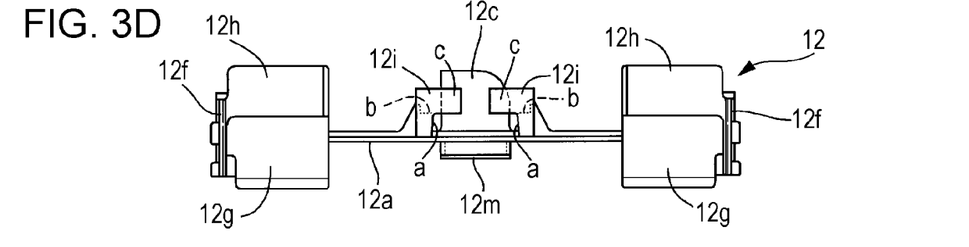

As shown in FIG. 1, a battery module M for a hybrid vehicle includes multiple battery cells 11 formed of, for example, lithium ion batteries. Each battery cell 11 has a rectangular parallelepiped shape and includes a pair of main cooling surfaces 11a that are rectangular and horizontally long, a pair of side surfaces 11b between the two main cooling surfaces 11a, and a top surface 11c and a bottom surface 11d between the two main cooling surfaces 11a. The top surface 11c is provided with a pair of terminals 11e protruding therefrom. The multiple battery cells 11 are stacked side-by-side with holders 12 each interposed between the main cooling surfaces 11a of adjacent battery cells 11. The holders 12 are composed of synthetic resin and have the same shape.

In this specification, a direction in which the multiple battery cells 11 are stacked will be defined as "stacking direction", the longitudinal direction of the rectangular main cooling surfaces 11a of the battery cells 11 will be defined as "width direction", and the lateral direction thereof will be defined as "height direction (vertical direction)".

Two end plates 13 are respectively stacked on the outer sides of a pair of holders 12 located at the opposite ends, in the stacking direction, of the stack of battery cells 11 and holders 12, which are alternately stacked in a side-by-side arrangement. The two end plates 13 are fastened to opposite ends of two ladder frames 14 by using bolts 15. The ladder frames 14 are disposed in the stacking direction along the side surfaces 11b of the battery cells 11. Thus, the battery cells 11, the holders 12, and the end plates 13 are bound together in a multilayer fashion. A sensor unit 16 that detects the voltage of the battery cells 11 is fixed to the outer side of one of the end plates 13 by using bolts 17.

Next, the structure of the holders 12 will be described with reference to FIGS. 2, 3A to 3D, 9, and 10.

The holders 12 all have the same shape and are interchangeable, and each include a main body 12a that extends along the main cooling surfaces 11a of the neighboring battery cells 11. The main body 12a is bent into a shape of a corrugated plate along multiple fold lines extending in the width direction so that multiple cooling air paths 18 (see FIGS. 7 and 9) through which cooling air flows are formed between the main body 12a and the main cooling surfaces 11a of the battery cells 11.

An upper portion of the main body 12a is provided with a pair of first engagement sections 12b and a plate-like second engagement section 12c. The first engagement sections 12b are L-shaped in cross section and are engageable with corners located between the side surfaces 11b and the top surface 11c of each of the neighboring battery cells 11. The second engagement section 12c protrudes toward a first side (i.e. right side in FIG. 2) in the stacking direction and is engageable with a mid-portion, in the width direction, of the top surface 11c of one of the neighboring battery cells 11. One side of the main body 12a is provided with a plate-like third engagement section 12d that protrudes toward the first side in the stacking direction and that is engageable with a mid-portion, in the height direction, of one of the side surfaces 11b of the aforementioned neighboring battery cell 11. The third engagement section 12d has two openings 12e so as not to block the cooling air paths 18.

A lower portion of the main body 12a is provided with a pair of plate-like fourth engagement sections 12f, a pair of plate-like upper load transmission sections 12g, a pair of plate-like lower load transmission sections 12h, and a pair of thermistor supporters 12i. The fourth engagement sections 12f protrude toward opposite sides in the stacking direction and are engageable with lower ends of the two side surfaces 11b of each neighboring battery cell 11. The upper load transmission sections 12g protrude toward a second side (i.e., left side in FIG. 2) in the stacking direction and abut on opposite ends, in the width direction, of the bottom surface 11d of the other neighboring battery cell 11. The lower load transmission sections 12h protrude toward the first side in the stacking direction so as to underlie the upper load transmission sections 12g of a neighboring holder 12. The thermistor supporters 12i protrude toward the first side in the stacking direction and face downward from a position where they are interposed between the pair of plate-like upper load transmission sections 12g.

At the lower end of the main body 12a, a pair of groove-like dew holding recesses 12j (see FIGS. 2 and 7) that extend in the width direction are respectively formed continuously in areas above the pair of plate-like lower load transmission sections 12h. Of the pair of fourth engagement sections 12f, the fourth engagement section 12f located at the downstream side of the cooling air paths 18 is provided with a dew discharge hole 12k (see FIGS. 2, 5, and 7) that extends through the fourth engagement section 12f and communicates with the dew holding recess 12j located at the downstream side.

Figure 9:
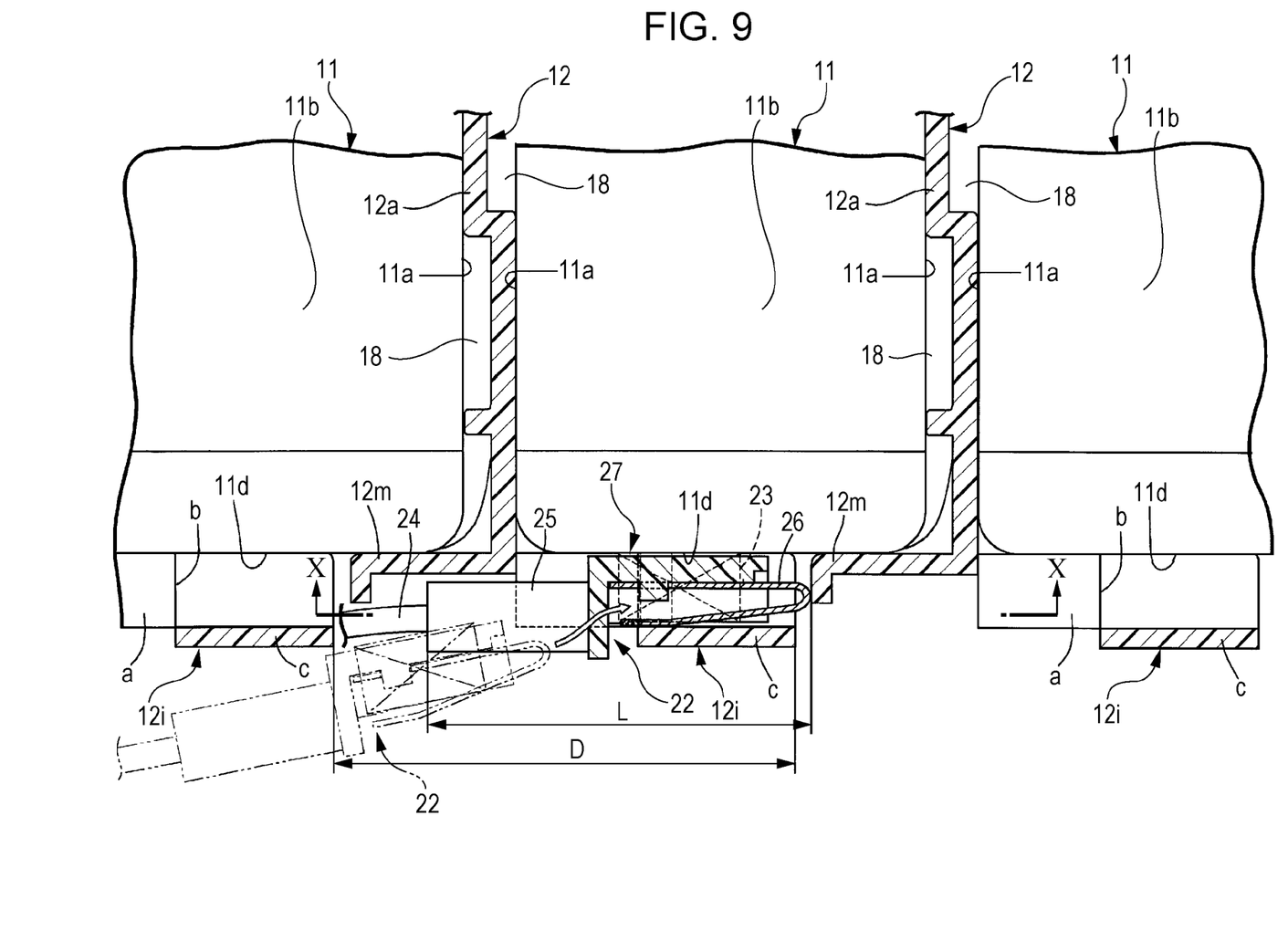
FIG. 9 is an enlarged cross-sectional view taken along line IX-IX in FIG. 5.
Figure 10:
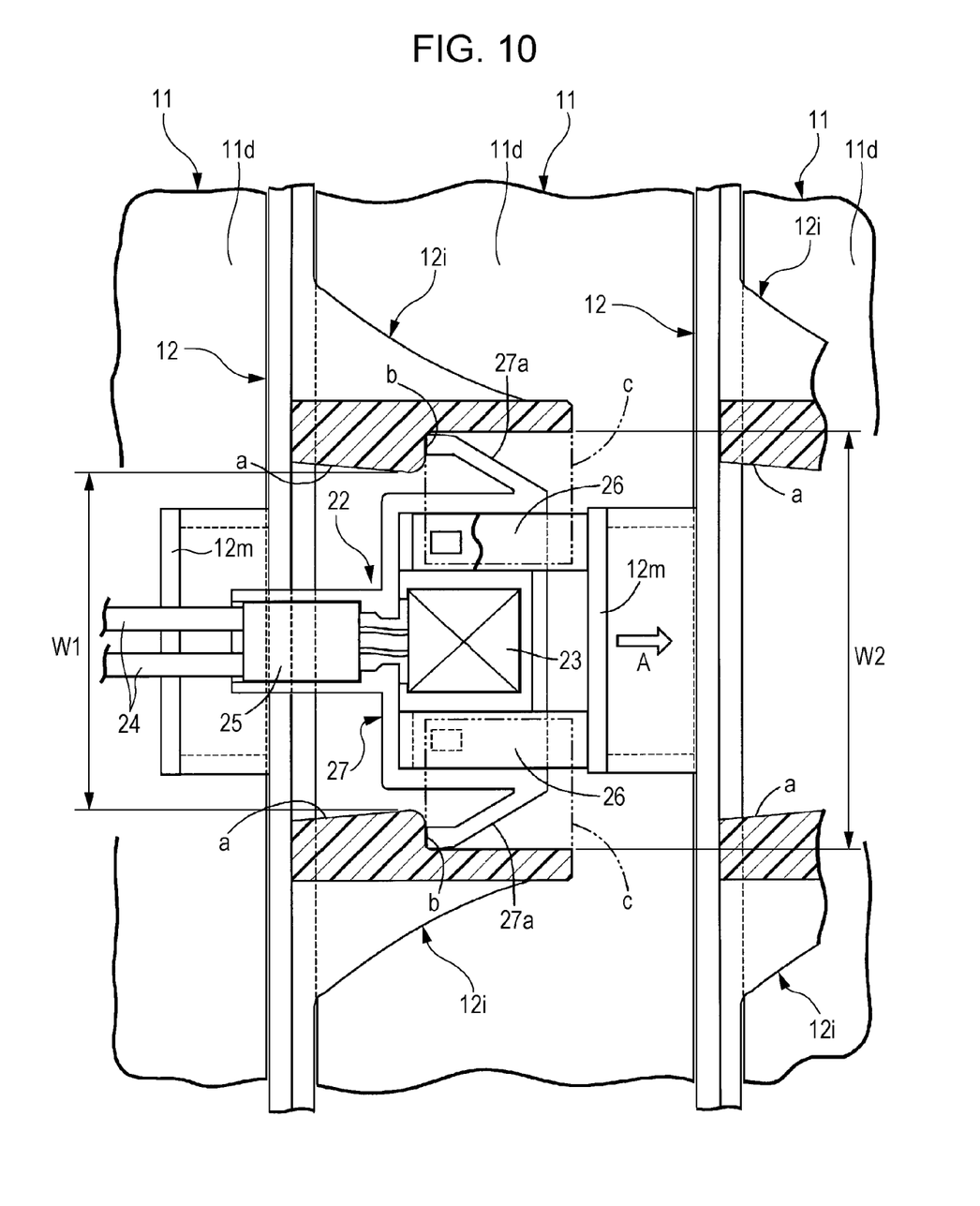
FIG. 10 is a cross-sectional view taken along line X-X in FIG. 9.

As shown in FIG. 10 in detail, the two thermistor supporters 12i include a pair of thermistor receiving segments a continuing with the lower edge of the main body 12a, a pair of thermistor engagement segments b extending from the two respective thermistor receiving segments a to the front side of a thermistor 22 (see FIG. 8), to be described later, in the inserting direction thereof, and a pair of plate-like cover segments c protruding from the two respective thermistor engagement segments b so as to cover the lower surfaces thereof. The width between the two thermistor engagement segments b is larger than a width W1 between the two thermistor receiving segments a. The lower end of each holder 12 is provided with two movement regulating sections 12m (see FIGS. 2, 3A to 3D, 9 and 10) that protrude in a direction opposite to the protruding direction of the thermistor supporters 12i.

Two neighboring holders 12 are joined to each other with a fixed positional relationship by engaging their first engagement sections 12b, fourth engagement sections 12f, upper load transmission sections 12g, and lower load transmission sections 12h extending from their main bodies 12a to each other. In this case, the lower surfaces of the upper load transmission sections 12g of one holder 12 overlie the upper surfaces of the lower load transmission sections 12h of the other holder 12 so that a labyrinth 33 (see FIG. 7) is formed therebetween. The main bodies 12a of the holders 12 abut on the main cooling surfaces 11a of the battery cells 11, and the first engagement sections 12b, the second engagement section 12c, the third engagement section 12d, the fourth engagement sections 12f, and the upper load transmission sections 12g of the holders 12 abut on the side surfaces 11b, the top surfaces 11c, and the bottom surfaces 11d of the battery cells 11, whereby the battery cells 11 are stably held in position within the holders 12.

Next, the structure of the end plates 13 will be described with reference to FIGS. 1, 5, and 6. Since the pair of end plates 13 substantially have mirror symmetry shapes, the structure of one of the end plates 13 will be representatively described.

Each end plate 13 has an inner wall surface 13a that abuts on the main body 12a of the holder 12 located at the corresponding end in the stacking direction, and an outer wall surface 13b located opposite to the inner wall surface 13a. A pair of side surfaces 13c, a top surface 13d, and a bottom surface 13e are formed between the inner wall surface 13a and the outer wall surface 13b.

The outer wall surface 13b of the end plate 13 is integrally provided with two hollow-rod-like first fixation segments 13f that are parallel to each other and protrude in the vertical direction beyond the top surface 13d and the bottom surface 13e, and is also integrally provided with a single hollow-rod-like second fixation segment 13g that protrudes in the width direction beyond the pair of side surfaces 13c. Two through-holes 13h respectively extend through the two first fixation segments 13f, and a through-hole 13i extends through the second fixation segment 13g. The first and second fixation segments 13f and 13g bulge from the outer wall surface 13b in the form of ridges so that the first and second fixation segments 13f and 13g function as reinforcement ribs for increasing the rigidity of the end plate 13.

Figure 4:
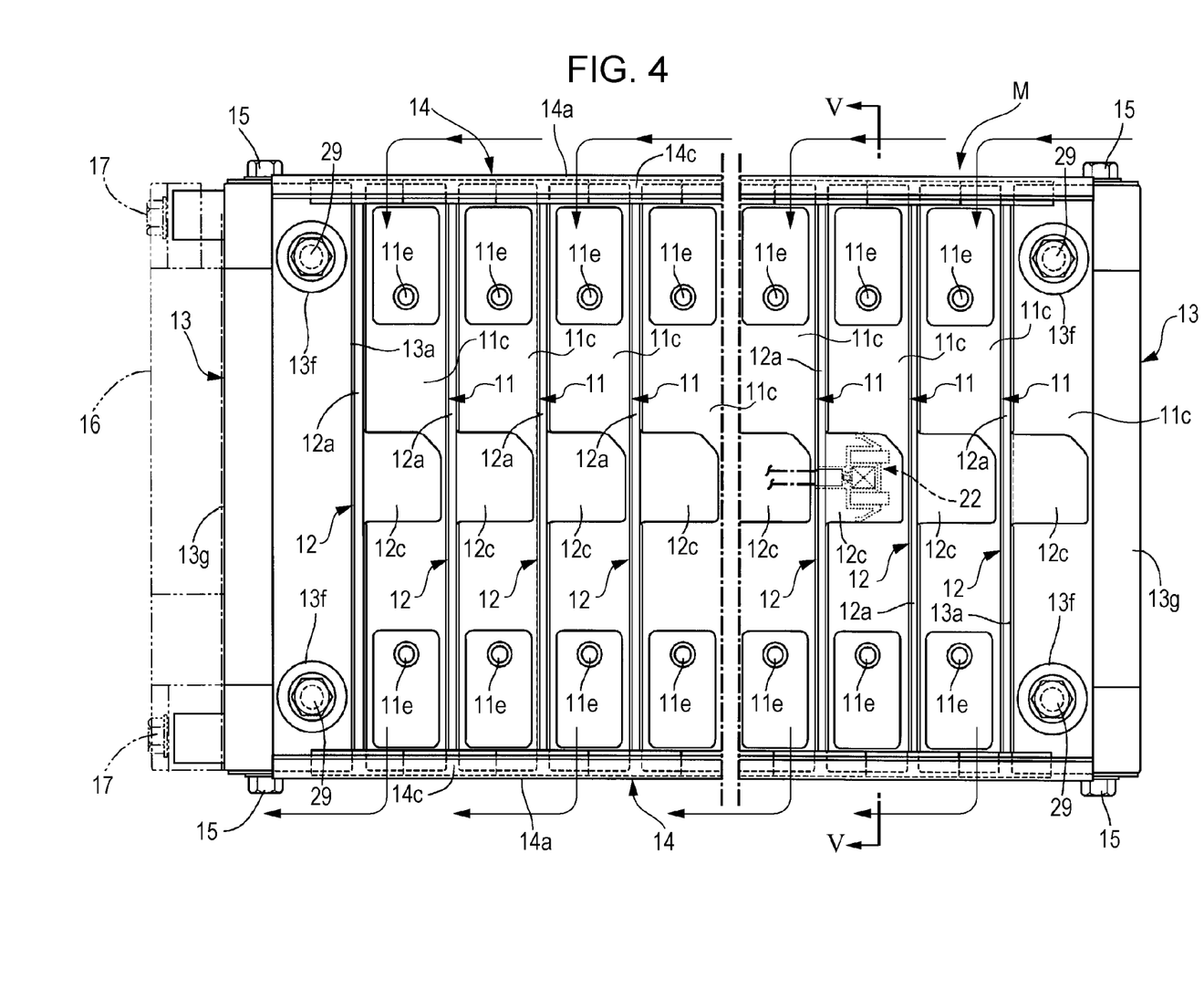
FIG. 4 is a diagram as viewed in a direction indicated by arrow IV in FIG. 1.
Figure 5:
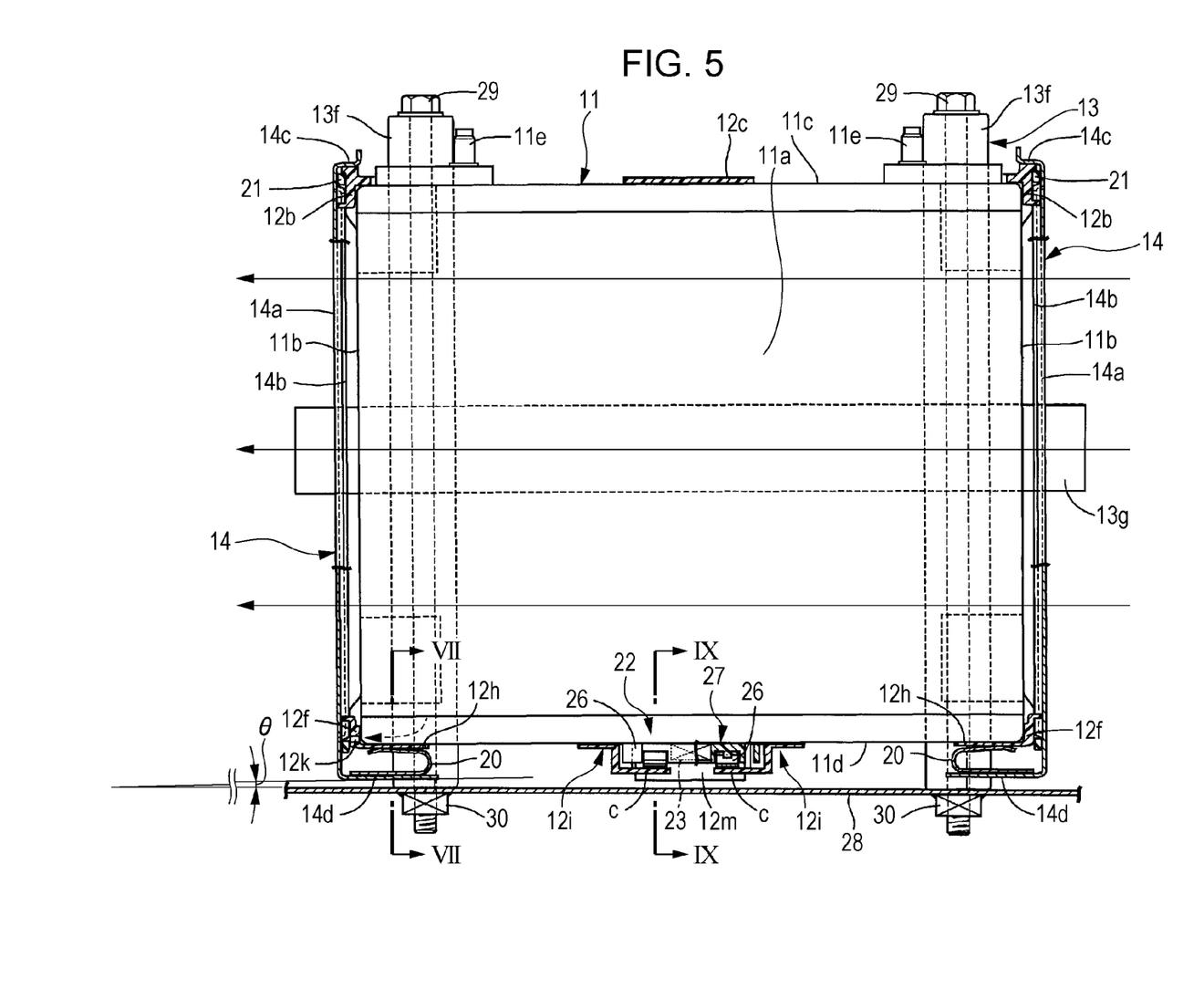
FIG. 5 is a cross-sectional view taken along line V-V in FIG. 4.
Figure 6:
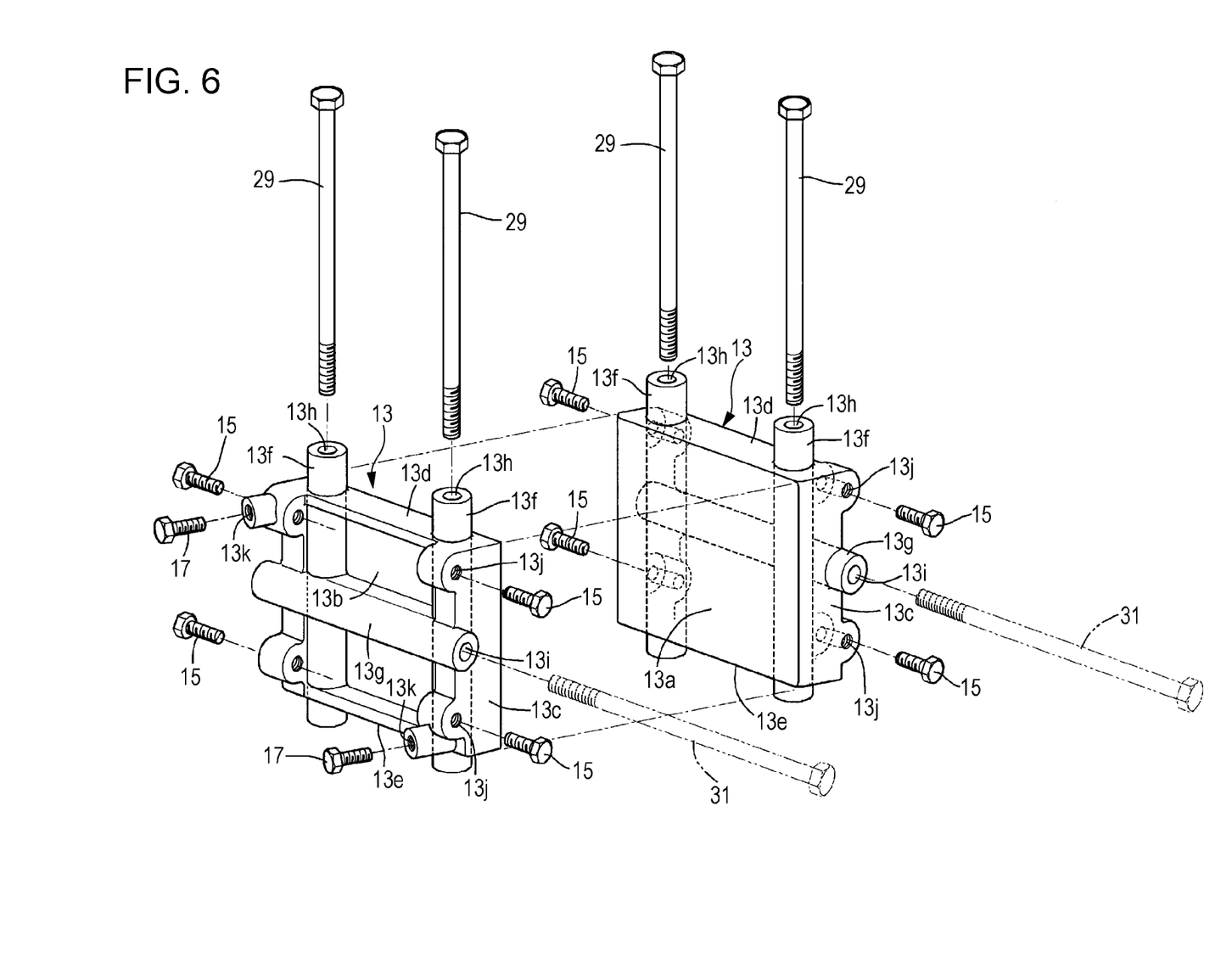
FIG. 6 is a perspective view of end plates.
Figure 7:
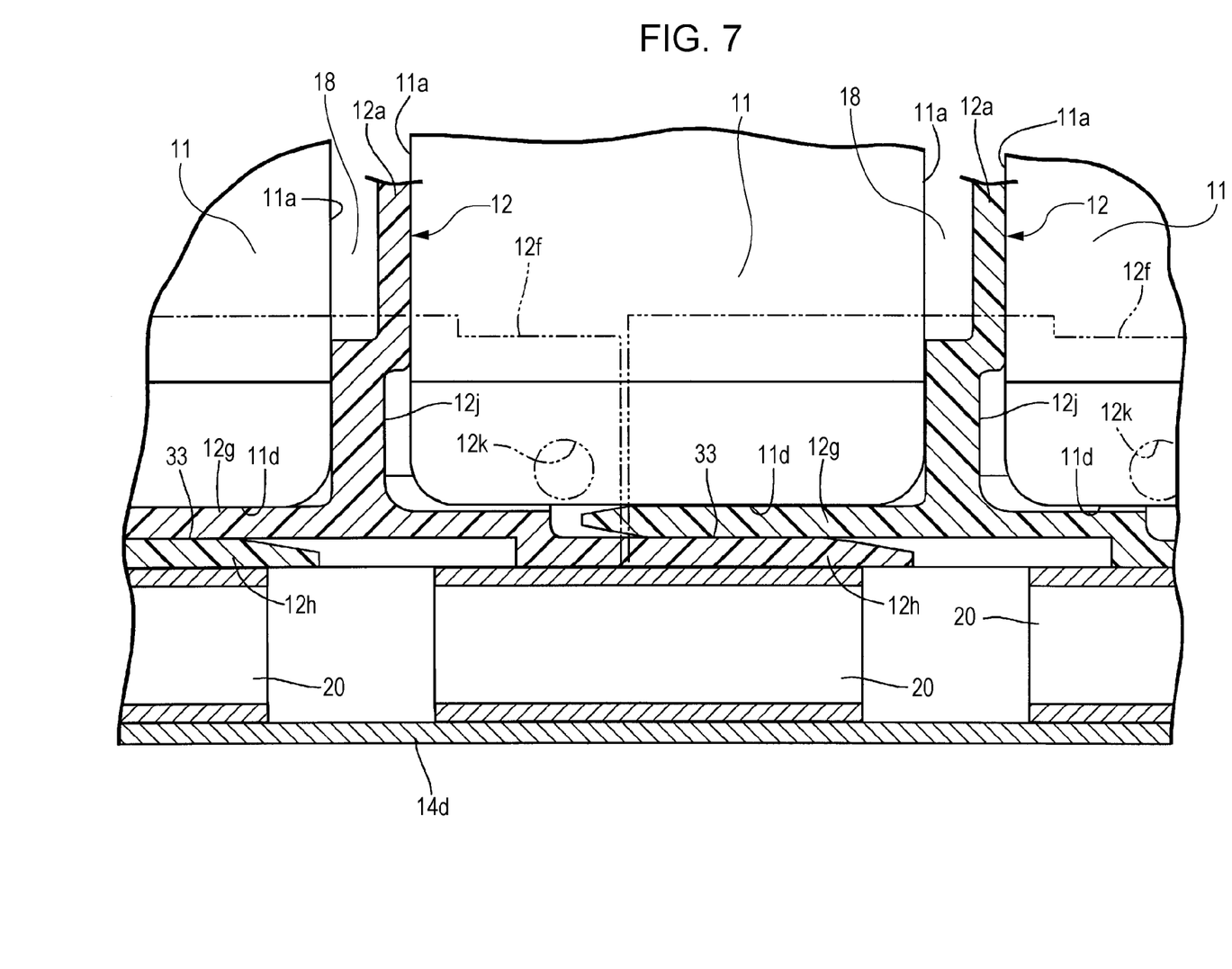
FIG. 7 is an enlarged cross-sectional view taken along line VII-VII in FIG. 5.

The height at the ends of the first fixation segments 13f protruding from the top surface 13d of the end plate 13 is set to be higher than the height at the pair of terminals 11e protruding from the top surface 11c of each battery cell 11 (see FIG. 5). Moreover, as viewed in the width direction, the two first fixation segments 13f protruding from the top surface 13d of the end plate 13 are positioned outside the pair of terminals 11e protruding from the top surface 11c of each battery cell 11 (see FIGS. 4 and 5).

The two side surfaces 13c of each end plate 13 are each provided with two bolt holes 13j into which two bolts 15 are screwed for fastening the end of the corresponding ladder frame 14 thereto. In addition, the outer wall surface 13b of one of the end plates 13 is provided with two bolt holes 13k into which two bolts 17 are screwed for fastening the sensor unit 16 thereto. These bolt holes 13k are not provided in the other end plate 13 since the sensor unit 16 is not fastened thereto.

FIGS. 1, 4, and 5 demonstrate that each ladder frame 14 is formed by pressing a metal plate, and a main body 14a thereof has multiple slits 14b extending in the vertical direction so as to supply cooling air to or discharge cooling air from the cooling air paths 18 (see FIGS. 7 and 9) formed by the main bodies 12a of the holders 12. The upper edge and the lower edge of the ladder frame 14 are bent inward in the width direction so as to have an upper flange 14c and a lower flange 14d, respectively. The upper surface of the lower flange 14d is provided with leaf springs 20, which is U-shaped in cross section, in correspondence with the battery cells 11. An inner wall surface of the main body 14a is provided with an annular seal member 21 that seals the gap between the main body 14a and the side surfaces 11b of the battery cells 11.

Therefore, in a state where the pair of ladder frames 14 and the pair of end plates 13 are fastened to each other, the first engagement sections 12b of the holders 12 abut on the lower surfaces of the upper flanges 14c and upper inner surfaces of the main bodies 14a of the ladder frames 14, the fourth engagement sections 12f of the holders 12 abut on lower inner surfaces of the main bodies 14a of the ladder frames 14, and the leaf springs 20 provided on the upper surfaces of the lower flanges 14d of the ladder frames 14 abut on the lower surfaces of the lower load transmission sections 12h of the holders 12 so as to bias the holders 12 upward, whereby the holders 12 are stably supported in position between the pair of ladder frames 14.

Figure 8:
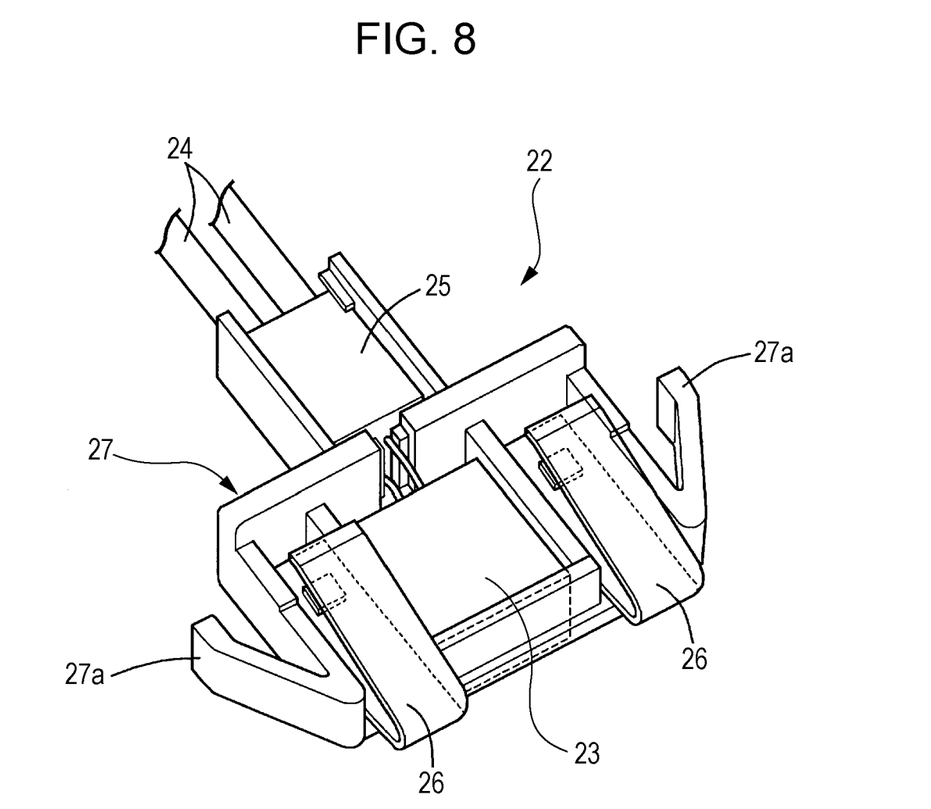
FIG. 8 is a perspective view of a thermistor.

Next, the mounting structure for the thermistor 22 will be described with reference to FIGS. 8 to 10.

The thermistor 22 is mounted to the thermistor supporters 12i of at least one holder 12 and is provided for detecting the temperature of the battery cells 11. At least one thermistor 22 is provided for the multiple battery cells 11 constituting the battery module M (see FIG. 4).

The thermistor 22 includes a sensor 23 that abuts on the bottom surface 11d of the corresponding battery cell 11, a connector 25 that connects the sensor 23 to a harness 24, a pair of sensor pressure springs 26 that are U-shaped in cross section and that press the sensor 23 against the bottom surface 11d of the battery cell 11, and a sensor casing 27 that is composed of synthetic resin and that supports the sensor 23, the connector 25, and the pair sensor pressure springs 26. The sensor casing 27 includes a pair of elastic claws 27a that are expandable and contractible with their own elasticity. A width W2 between the two elastic claws 27a in a free state and the width W1 between the two thermistor receiving segments a of the thermistor supporters 12i of the holder 12 have the following relationship: W2>W1 (see FIG. 10). Furthermore, a distance D between the thermistor supporters 12i of two neighboring holders 12 is set to be larger than a length L of the thermistor 22 in the inserting direction thereof (see FIG. 9). The harness 24 extending from the thermistor 22 is connected to the sensor unit 16, and the sensor unit 16 detects the temperature of the battery cell 11 on the basis of an output from the thermistor 22.

Next, the function of this embodiment of the present application having the above-described configuration will be described.

If dew formed on the surfaces of the battery cells 11 as a result of condensation of moisture in the air drops due to gravity and moistens the leaf springs 20 welded to the lower flanges 14d of the ladder frames 14, there is a possibility that the multiple battery cells 11 may short-circuit via the leaf springs 20 and the ladder frames 14. Moreover, if neighboring leaf springs 20 short-circuit due to the dew, the multiple battery cells 11 may sometimes short-circuit only via the leaf springs 20 but not via the ladder frames 14. In order to prevent this short-circuit from occurring, it is necessary to block the short-circuit paths between the lower portions of the battery cells 11 and the leaf springs 20. In other words, it is necessary to prevent continuous intervention of dew between the lower portions of the battery cells 11 and the leaf springs 20.

According to this embodiment, the labyrinths 33, which are long (see FIG. 7), formed in the contact surfaces between the upper load transmission sections 12g and the lower load transmission sections 12h intervene the bottom surfaces 11d of the battery cells 11 and the leaf springs 20 so that electrical conduction between the bottom surfaces 11d of the battery cells 11 and the leaf springs 20 is blocked simply by interruption of dew at one location over the overall length of the labyrinths 33, thereby reliably preventing a short-circuit from occurring between the battery cells 11. In addition, since at least two labyrinths 33 are interposed between two neighboring battery cells 11, it is conceivable that a short-circuit hardly occurs between the two battery cells 11 via the two labyrinths 33.

In contrast, assuming that the holders 12 are not provided with the upper load transmission sections 12g and the lower load transmission sections 12h and are simply butted against each other in the stacking direction, the bottom surfaces 11d of the battery cells 11 and the leaf springs 20 would become electrically connected to each other when the dew enters the abutment sections, possibly causing a short-circuit to occur between the battery cells 11.

Furthermore, according to this embodiment, since the dew holding recesses 12j (see FIG. 7) are formed in areas where the main body 12a of each holder 12 connects to the upper load transmission sections 12g, the dew can be temporarily held in these dew holding recesses 12j so as to prevent the dew from flowing into the labyrinth 33, thereby more reliably preventing the occurrence of a short-circuit.

Furthermore, as shown in FIG. 4, the cooling air flowing along one of the ladder frames 14 for cooling the battery module M enters the cooling air paths 18 of the holders 12 through the slits 14b in the ladder frame 14 and performs heat exchange with the main cooling surfaces 11a of the battery cells 11 while flowing through the cooling air paths 18, and is subsequently discharged from the slits 14b in the other ladder frame 14. Although it appears to be difficult to discharge the dew accumulated in the dew holding recesses 12j located downstream of the cooling air paths 18 since the dew is blocked by the fourth engagement sections 12f, the dew discharge holes 12k (see FIGS. 5 and 7) formed in the fourth engagement sections 12f located downstream of the cooling air paths 18 can facilitate the discharging of the dew from the dew holding recesses 12j.

Because the dew accumulated in the dew holding recesses 12j located upstream of the cooling air paths 18 is discharged to mid-portions, in the width direction, of the lower surfaces of the holders 12 by being pushed by the cooling air, this dew may possibly cause electrical conduction between the leaf springs 20 of one of the ladder frames 14 and the leaf springs 20 of the other ladder frame 14, thus causing a short-circuit to occur between the battery cells 11. However, in this embodiment, since the thermistor supporters 12i protrude downward from the mid-portions of the lower surfaces of the holders 12, the thermistor supporters 12i block the dew so as to avoid electrical conduction between the leaf springs 20 of the two ladder frames 14, thereby preventing a short-circuit from occurring between the battery cells 11.

As shown in FIG. 5, the battery module M is installed in a vehicle by securing the pair of end plates 13 to an upper surface of a support plate 28 that is fixed to the vehicle. The battery module M is normally installed in a position in which the top surfaces 11c of the battery cells 11 face upward while the bottom surfaces 11d face the support plate 28. In this case, two bolts 29 that extend vertically through the two respective first fixation segments 13f of each end plate 13 are screwed and fastened to weld nuts 30 welded to the lower surface of the support plate 28 so that the battery module M is secured to the support plate 28. Since this securing process only involves inserting a total of four bolts 29 downward and then rotating the bolts 29, extremely good workability is achieved.

When securing the battery module M set in the position shown in FIG. 5 to the support plate 28, it is desirable that the left fourth engagement sections 12f having the dew discharge holes 12k be disposed lower than the right fourth engagement sections 12f not having the dew discharge holes 12k so as to facilitate the discharging of dew from the dew discharge holes 12k in the fourth engagement sections 12f located downstream of the cooling air paths 18. Referring to FIG. 5, in this embodiment, the left first fixation segment 13f protrudes downward from the lower surface of each end plate 13 by a length that is shorter than a length by which the right first fixation segment 13f protrudes downward from the lower surface of the end plate 13. Thus, the two end plates 13 secured on the upper surface of the support plate 28, which is set in a horizontal position, are tilted down toward the left by an angle θ, thereby facilitating the discharging of dew from the dew discharge holes 12k.

The same effect can be achieved by fixing the two end plates 13 in parallel with the support plate 28 and then securing the support plate 28 in a tilted position relative to a horizontal plane to the vehicle so that the left fourth engagement sections 12f having the dew discharge holes 12k are disposed at lower positions.

Figure 11:
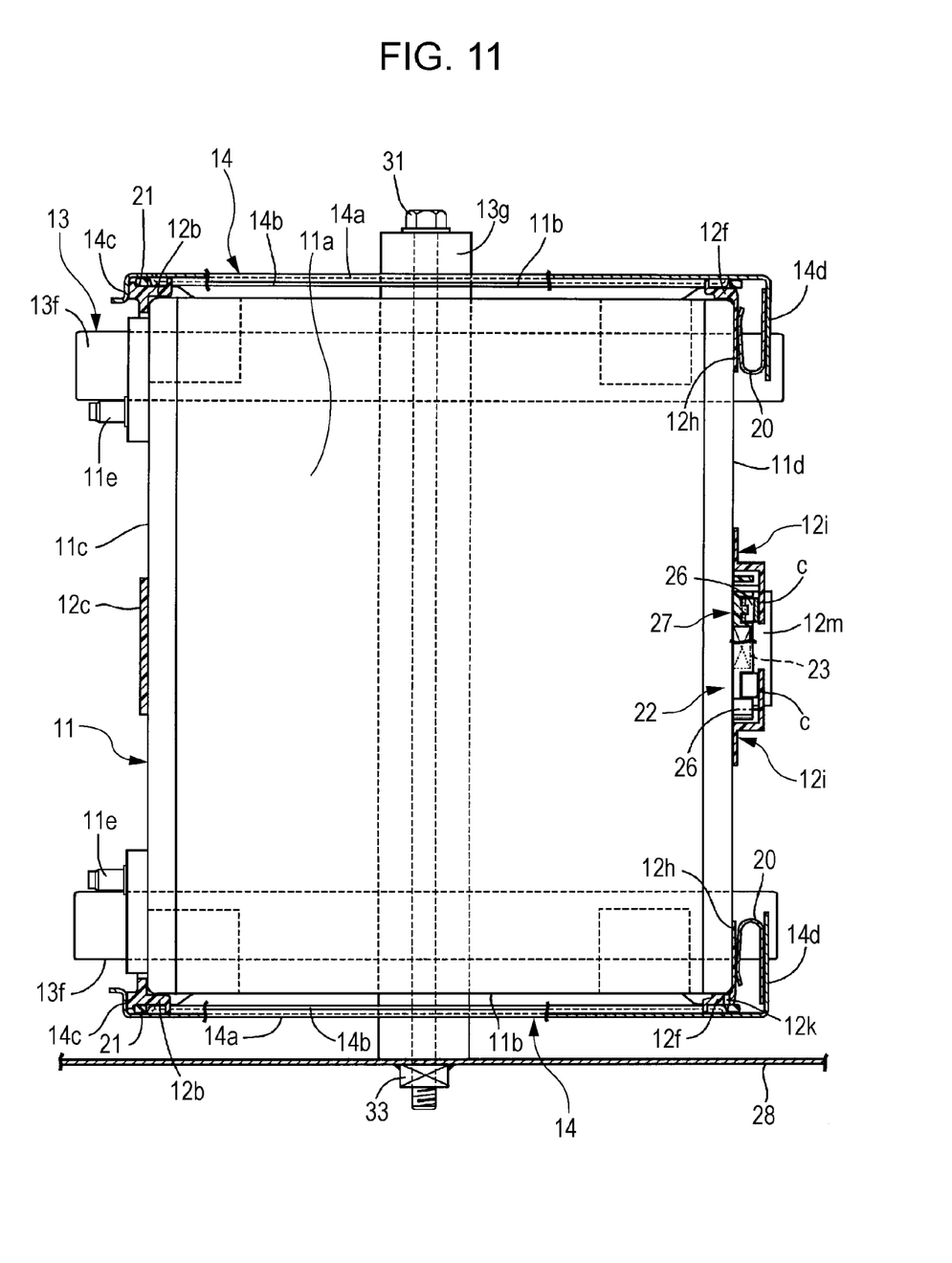
FIG. 11 is an operational diagram corresponding to FIG. 5.

If the vehicle is limited in space and the battery module M cannot be installed in the aforementioned normal position, the battery module M may be installed by turning it over by 90°. Specifically, as shown in FIG. 11, the battery module M may be secured to the support plate 28 by placing the battery module M on the support plate 28 such that one side surface 11b of each battery cell 11 faces downward, and then screwing and fastening bolts 31 extending vertically through the second fixation segments 13g of the end plates 13 to weld nuts 32 welded to the lower surface of the support plate 28. Similar to the above, since this securing process only involves inserting a total of two bolts 31 downward and then rotating the bolts 31, extremely good workability is achieved.

In the case where the battery module M is installed in the 90° position described above, although the one side surface 11b of each battery cell 11 faces downward, since the corresponding leaf spring 20 in this case is positioned to the side of the side surface 11b instead of below the side surface 11b, and a sufficient gap exists between the side surface 11b and the ladder frame 14 disposed therebelow, there is no possibility of a short-circuit.

Since each end plate 13 is provided with the pipe-like first fixation segments 13f and the pipe-like second fixation segment 13g along the outer wall surface 13b, the end plate 13 is increased in rigidity due to these fixation segments functioning as reinforcement ribs. Although the battery cells 11 tend to deform and expand due to a chemical reaction occurring therein, the two highly-rigid end plates 13 sandwiching the opposite ends of the stack of battery cells 11 can reliably prevent the deformation of the battery cells 11. In addition, since the bolts 15 or the bolts 17 extend through the through-holes 13h in the first fixation segments 13f or the through-holes 13i in the second fixation segments 13g, the rigidity of the end plates 13 can be further increased by the bolts 15 or 17.

Prior to being secured to the support plate 28, the battery module M is placed on the ground with the bottom surfaces 11d of the battery cells 11 facing downward. If for any reason the battery module M is turned over, the terminals 11e of the battery cells 11 may possibly come into contact with the ground and become damaged. However, in this embodiment, since the two first fixation segments 13f of each end plate 13 protrude upward beyond the ends of the pair of terminals 11e of each battery cell 11, and the two first fixation segments 13f are positioned outside, in the width direction, of the pair of terminals 11e of each battery cell (see FIGS. 4 and 5), the first fixation segments 13f would come into contact with the ground first even when the battery module M is turned over, so that the terminals 11e are prevented from coming into contact with the ground, thereby effectively preventing the terminals 11e from becoming damaged. The terminals 11e can be protected by the first fixation segments 13f not only when the battery module M is turned over, but also when a foreign object falls onto the battery module M from above.

After assembling the battery module M by alternately stacking the multiple battery cells 11 and the multiple holders 12 and then connecting the pair of end plates 13, which sandwich the opposite ends thereof in the stacking direction, to each other with the pair of ladder frames 14, the thermistor 22 is mounted to the thermistor supporters 12i of at least one of the holders 12.

Specifically, as shown in FIG. 10, the width W1 between the pair of thermistor receiving segments a of the thermistor supporters 12i of the each holder 12 and the width W2 between the pair of elastic claws 27a in a free state have the relationship W2>W1. Therefore, when the thermistor 22 is inserted between the thermistor supporters 12i of a predetermined holder 12 in a direction indicated by an arrow A from the bottom surface 11d side of the battery cells 11, as shown in FIG. 9, the pair of elastic claws 27a come into abutment with the thermistor receiving segments a and elastically deform so as to approach each other. After passing the thermistor receiving segments a, the elastic claws 27a expand into the free state due to their own elasticity and engage with the thermistor engagement segments b, whereby the thermistor 22 is supported by the thermistor supporters 12i in a drop-proof manner.

In this case, since the distance D between the thermistor supporters 12i of two neighboring holders 12 is set to be larger than the length L of the thermistor 22 in the inserting direction thereof, the thermistor 22 can be mounted after assembling the battery module M (see FIG. 9). In addition, since the thermistor 22 can be secured between the two thermistor supporters 12i of the aforementioned holder 12 by simply moving the thermistor 22 along the bottom surface 11d of a predetermined battery cell 11, the mountability of the thermistor 22 is improved as compared with a case where securing members, such as bolts, are used.

Since first ends of the pair of sensor pressure springs 26 provided in the sensor casing 27 abut on the cover segments c of the thermistor supporters 12i, a reaction force is generated and causes second ends of the sensor pressure springs 26 to press the sensor casing 27 upward so as to press the sensor 23 against the bottom surface 11d of the battery cell 11, whereby the sensor 23 comes into contact with the bottom surface 11d of the battery cell 11 and can reliably detect the temperature thereof. At the same time, ends of the sensor pressure springs 26 abut on the movement regulating sections 12m of a neighboring holder 12 so that the inserting end of the thermistor 22 is regulated while the other end thereof opposite the inserting end is regulated due to the engagement between the elastic claws 27a and the thermistor engagement segments b, whereby the thermistor 22 is reliably set in position. Moreover, with the sensor pressure springs 26 bending in the inserting direction of the thermistor 22, dimensional errors in the elastic claws 27a and the thermistor engagement segments b can be compensated for.

In this embodiment, since the thermistor 22 is secured to the thermistor supporters 12i provided in the lower portion of the holder 12 so as to be in contact with the bottom surface 11d of the battery cell 11, cooling air flowing along the pair of main cooling surfaces 11a from one side surface 11b side of the battery cell 11 and subsequently flowing out from the other side surface 11b side is less likely to interfere with the thermistor supporters 12i in the lower portion of the holder 12. Consequently, even with the multiple holders 12 having the same shape, a difference in a leakage of cooling air between the thermistor supporters 12i of the holder 12 equipped with the thermistor 22 and the thermistor supporters 12i of the holders 12 without the thermistor 22 is prevented, thereby achieving a uniformly cooled state of the battery cells 11 as well as a longer lifespan thereof.

Although the embodiment of the present application has been described above, the present application permits various design modifications within the scope of the application.

For example, although the thermistor 22 is provided at the bottom surface 11d side of the predetermined battery cell 11 in the above embodiment, the thermistor 22 may alternatively be provided at the top surface 11c side of the battery cell 11. However, if the thermistor 22 is provided at the top surface 11c side of the battery cell 11, the thermistor 22 may sometimes interfere with wires connected to the terminals 11e of the battery cell 11. Therefore, providing the thermistor 22 at the bottom surface 11d side of the battery cell 11 allows for better mountability.

A first aspect of the embodiment provides a battery module that includes multiple battery cells each having a top surface, a bottom surface, a pair of main cooling surfaces, and a pair of side surfaces and arranged in a stacked manner such that the main cooling surfaces face each other; multiple holders having the same shape and interposed between the main cooling surfaces of the stacked battery cells; and a thermistor that is inserted in and supported by a thermistor supporter of at least one of the holders so as to be in contact with at least one of the battery cells. A cooling medium flowing in from one side of the pair of side surfaces of each battery cell flows along the pair of main cooling surfaces and subsequently flows out from the other side of the pair of side surfaces. The thermistor includes a sensor that detects a temperature of the at least one battery cell, and a sensor casing that supports the sensor. The thermistor supporter provided at a position facing the top surface or the bottom surface of the at least one battery cell includes a thermistor receiving segment, a thermistor engagement segment that is provided forward, in an inserting direction of the thermistor, relative to the thermistor receiving segment and that has a width larger than the thermistor receiving segment, and a thermistor cover segment disposed such that a gap is formed between the thermistor cover segment and the top surface or the bottom surface of the at least one battery cell. The sensor casing includes a bias unit that presses the sensor against the top surface or the bottom surface of the at least one battery cell by utilizing a reaction force generated by pressing the thermistor cover segment, and an expandable-contractible elastic claw whose width in a free state thereof is larger than a width of the thermistor receiving segment. Accordingly, the cooling medium is less likely to interfere with the thermistor supporter of the holder. Thus, even with the multiple holders having the same shape, a difference in a leakage of cooling air between the thermistor supporter of the holder equipped with the thermistor and the thermistor supporter of the holder without the thermistor is prevented, thereby achieving a uniformly cooled state of the battery cells as well as a longer lifespan thereof. Moreover, when the thermistor is inserted into the thermistor supporter, the elastic claw expands after passing the thermistor receiving segment so as to engage with the thermistor engagement segment. Thus, in addition to the thermistor being readily and reliably secured to the thermistor supporter, the sensor is pressed against the battery cell by the bias unit in this state so that the thermistor can accurately measure the temperature of the battery cell.

Furthermore, in the battery module according to the first aspect, the thermistor may include multiple thermistors inserted in and supported by the thermistor supporters of the holders. In addition, each holder may include a movement regulating section on which an inserting end of the bias unit of the thermistor inserted in and supported by the thermistor supporter of another neighboring holder abuts. Moreover, a reaction force received by the bias unit from the movement regulating section preferably causes the elastic claw to be biased in a direction in which the elastic claw engages with the thermistor engagement segment. Accordingly, each of the mounted thermistors can be prevented from becoming loose. Furthermore, with the bias unit bending in the inserting direction of the thermistor, dimensional errors in the elastic claw and the thermistor engagement segment can be compensated for.

Furthermore, in the battery module according to the first aspect, a distance between the thermistor cover segment of one of a neighboring pair of the holders and the thermistor cover segment of the other thereof in the inserting direction of the thermistor is preferably larger than a length of the thermistor in the inserting direction. Accordingly, the mounting process of the thermistor can be performed after the battery module is assembled, thereby preventing the thermistor from becoming a hindrance to the assembly process of the battery module.

Furthermore, in the battery module according to the first aspect, the position at which the thermistor supporter is provided preferably faces the bottom surface where a terminal of the at least one battery cell is not disposed. Accordingly, the thermistor supported by the thermistor supporter is prevented from interfering with a wire connected to the terminal of the battery cell so that the mounting process of the thermistor can be readily performed, thereby allowing for improved mountability thereof.

Sensor pressure springs 26 according to an embodiment correspond to the bias unit according to the first aspect of the embodiment.

Obviously, numerous modifications and variations of the present invention are possible in light of the above teachings. It is therefore to be understood that within the scope of the appended claims, the invention may be practiced otherwise than as specifically described herein.

What is claimed is:
1. A battery module comprising:
a plurality of battery cells each having a top surface, a bottom surface, a pair of main cooling surfaces, and a pair of side surfaces, the battery cells being arranged in a stacked manner such that the main cooling surfaces face each other;
a plurality of holders having a substantially same shape and respectively provided between the main cooling surfaces facing each other, each of at least one of holders including a thermistor holder; and a thermistor inserted in an supported by a thermistor supporter to be in contact with at least one of the battery cells, the thermistor including a sensor and a sensor casing supporting the sensor, the sensor being configured to detect a temperature of the at least one of the battery cells, wherein cooling medium passages through which a cooling medium is to flow are respectively provided between the battery cells, the cooling medium passages each extending from one of the pair of side surfaces to another of the pair of side surfaces, wherein the thermistor supporter is provided to face one of the top surface and the bottom surface provided in the at least one of the battery cells, and includes a pair of thermistor receiving segments, a pair of thermistor engagement segments, and a thermistor cover portion, the pair of thermistor engagement segments being respectively provided forward in an inserting direction of the thermistor relative to the pair of thermistor receiving segments, a distance between the pair of thermistor engagement segments being larger than the pair of thermistor receiving segments, the thermistor cover portion being disposed so that a gap is provided between the thermistor cover portion and one of the top surface and the bottom surface provided in the at least one of the battery cells, and wherein the sensor casing includes a bias portion and an elastic claw portion, the bias portion being provided to press the sensor against one of the top surface and the bottom surface provided in the at least one of the battery cells by utilizing a reaction force generated by pressing the thermistor cover portion, a width of the elastic claw portion being larger than the distance between the pair of thermistor receiving segments when the elastic claw portion is in a free state, wherein the plurality of holders includes first and second holders, wherein the first holder includes the thermistor supporter, wherein the second holder includes a movement regulating section on which an inserting end of the thermistor abuts, and wherein a protruding portion of the bias portion protrudes from the sensor casing in the insertion direction and the protruding portion is to contact the movement regulating section.

2. The battery module according to claim 1, wherein a pitch between the thermistor cover portion provided in one of a neighboring pair of the holders and the thermistor cover portion provided in another of the neighboring pair of the holders in the inserting direction of the thermistor is larger than a length of the thermistor in the inserting direction.

3. The battery module according to claim 1,
wherein the thermistor supporter is provided to face a part of the bottom surface, and
wherein a terminal of the at least one of the battery cells is not disposed on the part of the bottom surface.

4. The battery module according to claim 1,
wherein each of the holders includes a holder main-body provided between the battery cells,
wherein the pair of thermistor receiving segments each extend from the holder main-body along the inserting direction, and
wherein the pair of thermistor engagement segments respectively extend from the pair of thermistor receiving segments along the inserting direction.

5. The battery module according to claim 4,
wherein the thermistor cover portion includes a pair of thermistor cover segments respectively extending from the pair of thermistor engagement segments to cover a part of the thermistor.

* * * * *